United States Patent
Yagi et al.

(10) Patent No.: US 10,787,531 B2
(45) Date of Patent: Sep. 29, 2020

(54) FLUORINATED ELASTIC COPOLYMER, METHOD FOR ITS PRODUCTION, CROSSLINKED RUBBER AND METHOD FOR ITS PRODUCTION

(71) Applicant: AGC Inc., Chiyoda-ku (JP)

(72) Inventors: Keisuke Yagi, Chiyoda-ku (JP); Takehiro Kose, Chiyoda-ku (JP); Hiroki Nagai, Chiyoda-ku (JP); Satoko Yasuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 308 days.

(21) Appl. No.: 15/880,647

(22) Filed: Jan. 26, 2018

(65) Prior Publication Data

US 2018/0148527 A1    May 31, 2018

Related U.S. Application Data

(63) Continuation of application No. PCT/JP2016/078720, filed on Sep. 28, 2016.

(30) Foreign Application Priority Data

Oct. 1, 2015 (JP) .................. 2015-196146

(51) Int. Cl.
| | |
|---|---|
| C08F 2/38 | (2006.01) |
| C08F 2/26 | (2006.01) |
| C08F 210/06 | (2006.01) |
| C08F 214/26 | (2006.01) |
| C08K 3/04 | (2006.01) |
| C08K 5/14 | (2006.01) |
| C08K 13/02 | (2006.01) |
| C08K 5/3492 | (2006.01) |
| C08K 5/00 | (2006.01) |

(52) U.S. Cl.
CPC ............ *C08F 214/265* (2013.01); *C08F 2/26* (2013.01); *C08F 2/38* (2013.01); *C08F 210/06* (2013.01); *C08F 214/26* (2013.01); *C08K 3/04* (2013.01); *C08K 5/14* (2013.01); *C08K 5/34924* (2013.01); *C08K 13/02* (2013.01); *C08K 5/0025* (2013.01)

(58) Field of Classification Search
CPC .......... C08F 214/265; C08F 2/26; C08F 2/38; C08F 210/06; C08F 214/26; C08K 3/04; C08K 5/14; C08K 5/34924; C08K 13/02; C08K 5/0025

USPC ........................................................ 524/546
See application file for complete search history.

(56) References Cited

U.S. PATENT DOCUMENTS

| | | | |
|---|---|---|---|
| 5,260,492 A | 11/1993 | Feiring et al. | |
| 5,948,868 A | 9/1999 | Albano et al. | |
| 7,488,787 B2 * | 2/2009 | Apostolo ............. | C08F 14/18 |
| | | | 525/326.3 |
| 7,947,791 B2 * | 5/2011 | Nomura ............... | C08F 214/18 |
| | | | 526/242 |
| 2003/0119993 A1 | 6/2003 | Apostolo et al. | |
| 2009/0186986 A1 | 7/2009 | Nomura et al. | |
| 2015/0141604 A1 | 5/2015 | Sugiyama et al. | |

FOREIGN PATENT DOCUMENTS

| | | |
|---|---|---|
| CN | 104583253 A | 4/2015 |
| EP | 1 308 467 A2 | 5/2003 |
| EP | 1 308 467 A3 | 5/2003 |
| JP | 5-222130 | 8/1993 |
| JP | 5-230151 | 9/1993 |
| JP | 6-136218 | 5/1994 |
| JP | 8-504810 | 5/1996 |
| JP | 9-124870 | 5/1997 |
| JP | 2008-308544 | 12/2008 |
| RU | 2 136 702 C1 | 9/1999 |
| WO | WO 2010/053056 A1 | 5/2010 |

\* cited by examiner

*Primary Examiner* — Kelechi C Egwim

(74) *Attorney, Agent, or Firm* — Oblon, McClelland, Maier & Neustadt, L.L.P.

(57) ABSTRACT

To provide a fluorinated elastic copolymer capable of obtaining a crosslinked rubber which is excellent in tensile strength and has a low compression set under high temperature conditions; a method for producing such a fluorinated elastic copolymer; a crosslinked rubber; and a method for producing such a crosslinked rubber. A fluorinated elastic copolymer having structural units based, respectively, on monomers (a), (b) and (c), and further having iodine atoms. Monomer (a): at least one member selected from the group consisting of tetrafluoroethylene, hexafluoropropylene, vinylidene fluoride, chlorotrifluoroethylene and perfluoro (alkyl vinyl ether). Monomer (b): at least one member selected from the group consisting of compounds represented by formula (I): $CR^1R^2\!=\!CR^3\!-\!R^4\!-\!CR^5\!=\!CR^6R^7$ (I) (wherein $R^1$, $R^2$, $R^3$, $R^5$, $R^6$ and $R^7$ are each independently a hydrogen atom, a fluorine atom or a methyl group; and $R^4$ is a $C_{1-10}$ perfluoroalkylene group which may have an etheric oxygen atom inserted between carbon atoms). Monomer (c): at least one member selected from the group consisting of ethylene and propylene.

13 Claims, No Drawings

FLUORINATED ELASTIC COPOLYMER, METHOD FOR ITS PRODUCTION, CROSSLINKED RUBBER AND METHOD FOR ITS PRODUCTION

TECHNICAL FIELD

The present invention relates to a fluorinated elastic copolymer, a method for producing a fluorinated elastic copolymer, a crosslinked rubber and a method for producing a crosslinked rubber.

BACKGROUND ART

A fluorinated elastic copolymer is excellent in heat resistance, chemical resistance, oil resistance, weather resistance, etc., and therefore, it is suitable for use in such a severe environment that polymers of hydrocarbon type cannot withstand. As the fluorinated elastic copolymer, a vinylidene fluoride/hexafluoropropylene type copolymer, a tetrafluoroethylene/propylene type copolymer, a tetrafluoroethylene/perfluoro(alkyl vinyl ether) type copolymer, etc. are known.

Generally, a fluorinated elastic copolymer is poor in reactivity, and therefore, for the purpose of improving the crosslinking reactivity with a peroxide at the time of forming a crosslinked rubber, a fluorinated chain transfer agent having an iodine atom is used at the time of producing a fluorinated elastic copolymer (Patent Document 1). However, in the production method described in Patent Document 1, the polymerization speed was slow, and the productivity of the fluorinated elastic copolymer was very low. Further, the fluorinated elastic copolymer thereby obtainable was insufficient in the crosslinking reactivity, and also the crosslinked rubber physical properties such as the compression set, etc. were not satisfactory.

For the purpose of improving the above-mentioned crosslinking reactivity and crosslinked rubber physical properties, a fluorinated elastic copolymer has been proposed which is obtained by copolymerizing a specific fluorinated monomer and a monomer selected from the group consisting of vinyl crotonate, vinyl adipate and 1,4-butanediol divinyl ether, in the presence of a fluorinated chain transfer agent having an iodine atom (Patent Document 2).

PRIOR ART DOCUMENTS

Patent Documents

Patent Document 1: JP-A-5-222130
Patent Document 2: WO2010/053056

DISCLOSURE OF INVENTION

Technical Problem

However, further improvement in the crosslinking reactivity and the crosslinking rubber physical properties are desired for the fluorinated elastic copolymers of Patent Documents 1 and 2. In particular, improvement in the crosslinked rubber physical properties such as the compression set, etc. under high temperature conditions severer than heretofore is desired.

An object of the present invention is to provide a fluorinated elastic copolymer capable of obtaining a crosslinked rubber which is excellent in tensile strength and has a low compression set under high temperature conditions, a method for producing such a fluorinated elastic copolymer, a crosslinked rubber and a method for producing the crosslinked rubber.

Solution to Problem

[1] A fluorinated elastic copolymer characterized by having iodine atoms and also having structural units (A) based on the following monomer (a), structural units (B) based on the following monomer (b) and structural units (C) based on the following monomer (c):

Monomer (a): at least one member selected from the group consisting of tetrafluoroethylene, hexafluoropropylene, vinylidene fluoride, chlorotrifluoroethylene and a perfluoro(alkyl vinyl ether), Monomer (b): at least one member selected from the group consisting of compounds represented by the following formula (I),

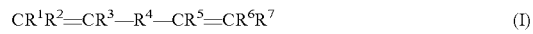

$$CR^1R^2=CR^3-R^4-CR^5=CR^6R^7 \qquad (I)$$

(wherein $R^1$, $R^2$, $R^3$, $R^5$, $R^6$ and $R^7$ are each independently a hydrogen atom, a fluorine atom or a methyl group, and $R^4$ is a $C_{1-10}$ perfluoroalkylene group or such a perfluoroalkylene group having an etheric oxygen atom at one or each of its both terminals or between carbon-carbon bond atoms), Monomer (c): at least one member selected from the group consisting of ethylene and propylene.

[2] The fluorinated elastic copolymer according to the above [1], wherein the content of the structural units (B) to all structural units in the fluorinated elastic copolymer is from 0.1 to 1.5 mol %.

[3] The fluorinated elastic copolymer according to the above [1] or [2], wherein the molar ratio of the structural units (A) to the structural units (C) ((A)/(C)) is from 30/70 to 99/1.

[4] The fluorinated elastic copolymer according to any one of the above [1] to [3], wherein $R^1$, $R^2$, $R^3$, $R^5$, $R^6$ and $R^7$ are each independently a fluorine atom or a hydrogen atom.

[5] The fluorinated elastic copolymer according to any one of the above [1] to [4], wherein the monomer (b) is at least one member selected from the group consisting of $CF_2=CFO(CF_2)_3OCF=CF_2$, $CF_2=CFO(CF_2)_4OCF=CF_2$ and $CH_2=CH(CF_2)_6CH=CH_2$.

[6] The fluorinated elastic copolymer according to any one of the above [1] to [5], wherein the content of iodine atoms in the fluorinated elastic copolymer is from 0.01 to 5 mass % to the total mass of the fluorinated elastic copolymer.

[7] The fluorinated elastic copolymer according to any one of the above [1] to [6], wherein the monomer (a) is tetrafluoroethylene, the monomer (c) is propylene, and the molar ratio of the structural units (A) to the structural units (C) ((A)/(C)) is from 40/60 to 60/40.

[8] A method for producing a fluorinated elastic copolymer, characterized by copolymerizing the following monomer (a), the following monomer (b) and the following monomer (c) in the presence of a radical polymerization initiator and an iodo compound represented by the formula $RI_2$ (wherein R is an alkylene group or perfluoroalkylene group having at least 3 carbon atoms):

Monomer (a): at least one member selected from the group consisting of tetrafluoroethylene, hexafluoropropylene, vinylidene fluoride, chlorotrifluoroethylene and a perfluoro(alkyl vinyl ether), Monomer (b): at least one member selected from the group consisting of compounds represented by the following formula (I),

$$CR^1R^2{=}CR^3{-}R^4{-}CR^5{=}CR^6R^7 \qquad (I)$$

(wherein $R^1$, $R^2$, $R^3$, $R^5$, $R^6$ and $R^7$ are each independently a hydrogen atom, a fluorine atom or a methyl group, and $R^4$ is a $C_{1-10}$ perfluoroalkylene group or such a perfluoroalkylene group having an etheric oxygen atom at one or each of its both terminals or between carbon-carbon bond atoms), Monomer (c): at least one member selected from the group consisting of ethylene and propylene.

[9] The method for producing a fluorinated elastic copolymer according to the above [8], wherein the polymerization temperature is within a range of from 0° C. to 60° C.

[10] A crosslinked rubber having the fluorinated elastic copolymer as defined in any one of the above [1] to [7] crosslinked.

[11] A method for producing a crosslinked rubber, characterized by crosslinking the fluorinated elastic copolymer as defined in any one of the above [1] to [7] with an organic peroxide, to obtain a crosslinked rubber.

[12] A crosslinkable composition comprising the fluorinated elastic copolymer as defined in any one of the above [1] to [7] and an organic peroxide.

[13] The crosslinkable composition according to the above [12], which further contains at least one additive selected from a crosslinking aid, a processing aid, a filler and a reinforcing agent.

Advantageous Effects of Invention

The fluorinated elastic copolymer of the present invention is excellent in crosslinking reactivity. Further, according to the fluorinated elastic copolymer of the present invention, it is possible to obtain a crosslinked rubber which is excellent in tensile strength and has a low compression set under high temperature conditions.

According to the method for producing a fluorinated elastic copolymer of the present invention, the above-mentioned fluorinated elastic copolymer of the present invention can be easily produced.

The crosslinked rubber of the present invention is excellent in tensile strength and has excellent crosslinked rubber physical properties such that the compression set is small even at a high temperature of from 200 to 250° C.

According to the method for producing a crosslinked rubber of the present invention, a crosslinked rubber having the above-mentioned excellent crosslinked rubber physical properties can easily be produced.

DESCRIPTION OF EMBODIMENTS

Hereinafter, tetrafluoroethylene will be referred to as TFE, hexafluoropropylene as HFP, vinylidene fluoride as VdF, chlorotrifluoroethylene as CTFE, a perfluoro(alkyl vinyl ether) as PAVE, a perfluoro(methyl vinyl ether) as PMVE, and a perfluoro(propyl vinyl ether) as PPVE.

Further, structural units based on each monomer will be represented by attaching "units" to the monomer name (e.g. "TFE units"). Further, structural units based on propylene will be referred to as "P units".

<Fluorinated Elastic Copolymer>

The fluorinated elastic copolymer of the present invention has iodine atoms and also has structural units (A) based on monomer (a), structural units (B) based on monomer (b) and structural units (C) based on monomer (c).

Hereinafter, the fluorinated elastic copolymer of the present invention will be referred to also as "copolymer X".

Monomer (a) is at least one member selected from the group consisting of TFE, HFP, VdF, CTFE and PAVE.

As monomer (a), from the viewpoint of obtaining excellent crosslinking reactivity, at least one member selected from the group consisting of TFE, HFP, VdF and PAVE, is more preferred, and TFE is most preferred.

As PAVE, a monomer represented by the following formula (II) is preferred.

$$CF_2{=}CF{-}O{-}R^f \qquad (II)$$

In the formula (II), $R^f$ represents a $C_{1-8}$ perfluoroalkyl group which may contain an etheric oxygen. The number of carbon atoms in $R^f$ is preferably from 1 to 6, more preferably from 1 to 5.

Specific examples of PAVE include PMVE, perfluoro(ethyl vinyl ether), PPVE, perfluoro(3,6-dioxa-1-heptene), perfluoro(3,6-dioxa-1-octene), perfluoro(5-methyl-3,6-dioxa-1-nonene), etc.

Monomer (b) is at least one member selected from the group consisting of monomers represented by the following formula (I).

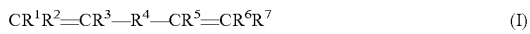

$$CR^1R^2{=}CR^3{-}R^4{-}CR^5{=}CR^6R^7 \qquad (I)$$

In formula (I), $R^1$, $R^2$, $R^3$, $R^5$, $R^6$ and $R^7$ are each independently a hydrogen atom, a fluorine atom or a methyl group, and $R^4$ is a $C_{1-10}$ perfluoroalkylene group or such a perfluoroalkylene group having an etheric oxygen atom at one or each of its both terminals or between carbon-carbon bond atoms.

From the viewpoint of improving the crosslinking reactivity and heat resistance of copolymer X, $R^1$, $R^2$, $R^3$, $R^5$, $R^6$ and $R^7$ of the above compound are preferably each independently a fluorine atom or a hydrogen atom; it is more preferred that all of $R^1$, $R^2$, $R^3$, $R^5$, $R^6$ and $R^7$ are fluorine atoms, or all of them are hydrogen atoms, and it is particularly preferred that all of $R^1$, $R^2$, $R^3$, $R^5$, $R^6$ and $R^7$ are fluorine atoms.

$R^4$ may be linear or branched but is preferably linear. The number of carbon atoms in $R^4$ is preferably from 2 to 8, more preferably from 3 to 7, further preferably from 3 to 6, particularly preferably from 3 to 5. Further, the number of etheric oxygen atoms in $R^4$ is preferably from 0 to 3, more preferably 1 or 2. One or two etheric oxygen atoms are preferably present at the terminals of the perfluoroalkylene group. When $R^4$ is in such preferred ranges, the tensile strength of the crosslinked rubber will be excellent and the compression set at high temperatures will be smaller.

Monomer (b) may, for example, be a compound in which to each of both terminals of a $C_{1-10}$ perfluoroalkylene group, a vinyl group or trifluoromethyl vinyl group is bonded via or without via an etheric oxygen atom.

Preferred specific examples of monomer (b) include $CF_2{=}CFO(CF_2)_3OCF{=}CF_2$, $CF_2{=}CFO(CF_2)_4OCF{=}CF_2$, $CH_2{=}CH(CF_2)_6CH{=}CH_2$, etc. Copolymer X having at least one of these compounds, is excellent in crosslinking reactivity, and a crosslinked rubber after the crosslinking (vulcanization) will be excellent in tensile strength and will have a smaller compression set at high temperatures.

When monomer (b) represented by the formula (I) is copolymerized, a part of polymerizable double bonds at both terminals of monomer (b) is reacted during the polymerization, whereby copolymer X having a branched chain will be obtained.

Monomer (c) is at least one member selected from the group consisting of ethylene and propylene. As monomer (c), propylene is preferred.

The content of the structural units (B) to all structural units in copolymer X is preferably from 0.1 to 1.5 mol %, more preferably from 0.15 to 0.8 mol %, further preferably from 0.25 to 0.6 mol %.

When it is at least the lower limit value in the above range, the crosslinking reactivity is excellent, and a crosslinked rubber will be excellent in tensile strength and will have a smaller compression set at high temperatures.

When it is at most the upper limit value in the above range, it is possible to certainly prevent or further reduce cracking in a case where a stress such as bending is exerted at a high temperature, while maintaining the above-mentioned excellent physical properties as a crosslinked rubber.

The molar ratio of the structural units (A) to the structural units (C) [(A)/(C)] is preferably from 30/70 to 99/1, more preferably from 30/70 to 70/30, further preferably from 40/60 to 60/40. Within such a range, the crosslinked rubber physical properties will be excellent, i.e. the heat resistance, chemical resistance, oil resistance and weather resistance will be excellent.

In copolymer X, specific examples for the combination of the structural units (A) and the structural unit (C), include the following combinations 1 to 4, etc. From the viewpoint of the excellent crosslinking reactivity of copolymer X and further the excellent mechanical properties, heat resistance, chemical resistance, oil resistance and weather resistance of the crosslinked rubber, combination 1, combination 2 or combination 4 is more preferred, and combination 1 is further preferred.

Combination 1: a combination of TFE units and P units.
Combination 2: a combination of TFE units, P units and VdF units.
Combination 3: a combination of TFE units, P units and PPVE units.
Combination 4: a combination of TFE units, P units and PMVE units.

The copolymer compositions in combinations 1 to 4 are preferably in the following molar ratios. In the following molar ratios, the crosslinking reactivity of each copolymer will be more excellent, and further the mechanical properties, heat resistance, chemical resistance, oil resistance, and weather resistance of the crosslinked rubber will be excellent.

Combination 1: TFE units/P units=40/60 to 60/40 (molar ratio)
Combination 2: TFE units/P units/VdF units=40 to 59/59 to 40/1 to 10 (molar ratio)
Combination 3: TFE units/P units/PPVE units=30 to 60/10 to 40/10 to 40 (molar ratio)
Combination 4: TFE units/P units/PMVE units=30 to 60/10 to 40/10 to 40 (molar ratio)

Copolymer X may have, within a range not to impair the effects of the present invention, structural units based on a monomer other than monomers (a), (b) and (c), in addition to them. Such other monomer may be a fluorinated monomer or a non-fluorinated monomer.

The fluorinated monomer may, for example, be vinyl fluoride, pentafluoropropylene, perfluoro-cyclobutene, a (perfluoroalkyl) ethylene such as $CH_2=CHCF_3$, $CH_2=CHCF_2CF_3$, $CH_2=CHCF_2CF_2CF_3$, $CH_2=CHCF_2CF_2CF_2CF_3$ or $CH_2=CHCF_2CF_2CF_2CF_2CF_3$, etc.

The non-fluorinated monomer may, for example, be an α-olefin such as isobutylene or pentene, a vinyl ether such as methyl vinyl ether, ethyl vinyl ether, propyl vinyl ether or butyl vinyl ether, a vinyl ester such as vinyl acetate, vinyl propionate, vinyl butyrate, vinyl caproate or vinyl caprylate, etc.

The content of structural units based on other monomer is preferably from 0.001 to 2.0 mol %, more preferably from 0.01 to 1.0 mol %, particularly preferably from 0.01 to 0.5 mol %, in copolymer X.

As other monomer, a monomer having an iodine atom may be used. When a monomer having an iodine atom is copolymerized, it is possible to introduce an iodine atom also in the side chain of copolymer X.

The monomer having an iodine atom may, for example, be iodo ethylene, 4-iodo-3,3,4,4-tetrafluoro-1-butene, 2-iodo-1,1,2,2-tetrafluoro-1-vinyloxyethane, 2-iodoethyl vinyl ether, allyl iodide, 1,1,2,3,3,3-hexafluoro-2-iodo-1-(perfluoro vinyloxy)propane, 3,3,4,5,5,5-hexafluoro-4-iodopentene, iodotrifluoroethylene, 2-iodoperfluoro(ethyl vinyl ether), etc.

The content of structural units based on a monomer having an iodine atom, is preferably from 0.001 to 2.0 mol %, more preferably from 0.01 to 1.0 mol %, particularly preferably from 0.01 to 0.5 mol %, in copolymer X.

The storage modulus G' of copolymer X is preferably from 100 kPa to 600 kPa, more preferably from 200 kPa to 500 kPa, further preferably from 200 kPa to 400 kPa. The larger the storage modulus G', the larger the molecular weight of the polymer, and the higher the density in entanglement of molecular chains. Here, the storage modulus G' is a value measured in accordance with ASTM D5289 and D6204 at a temperature of 100° C. at an amplitude of 0.5° at a frequency of 50 times/min.

Iodine atoms in copolymer X are preferably present at terminals of the copolymer X (polymer chain). Here, terminals mean both terminals of the main chain and terminals of branched chains in copolymer X. Iodine atoms are preferably iodine atoms derived from an iodo compound that functions as a chain transfer agent as described later.

Iodine atoms contained in copolymer X are not limited to those derived from the iodo compound, and, for example, in the case of copolymer X having structural units based on the above-mentioned monomer having an iodine atom, they may be iodine atoms in such structural units.

The content of iodine atoms in copolymer X is preferably from 0.01 to 5.0 mass %, more preferably from 0.05 to 2.0 mass %, most preferably from 0.05 to 1.0 mass %.

When the content of iodine atoms is within the above range, the crosslinking reactivity of copolymer X will be further excellent, and the mechanical properties of the crosslinked rubber will be further excellent.

As an index for the crosslinking properties of copolymer X, $M_H$-$M_L$ (crosslinking degree) to be measured by the method described later in Examples may be mentioned. Usually, the larger the numerical value of the crosslinking degree, the higher the crosslinking reactivity. The above crosslinking degree of the copolymer X is preferably from 55 dNm to 150 dNm, more preferably from 65 dNm to 140 dNm, further preferably from 70 dNm to 130 dNm.

When the crosslinking degree is within the above range, the crosslinking reaction will proceed at an appropriate speed, and the crosslinked rubber will be excellent in tensile strength and will have a smaller compression set at high temperatures.

Copolymer X is preferably produced by the following method for producing copolymer X, but is not limited to one produced by the following production method.

<Method for Producing Fluorinated Elastic Copolymer>

The method for producing copolymer X of the present invention is a method for copolymerizing the monomer (a), the monomer (b) and the monomer (c) in the presence of a radical polymerization initiator and an iodo compound represented by the formula $RI_2$ (wherein R is an alkylene group or perfluoroalkylene group having at least 3 carbon atoms).

In the present invention, the iodo compound represented by the formula $RI_2$ is a compound wherein an iodine atom is attached to each terminal of the alkylene group or perfluoroalkylene group having at least 3 carbon atoms. Specific examples include 1,3-diiodopropane, 1,4-diiodobutane, 1,6-diiodohexane, 1,8-diiodooctane, 1,3-diiodoperfluoropropane, 1,4-diiodoperfluorobutane, 1,6-diiodoperfluorohexane, 1,8-diiodoperfluorooctane, etc. The number of carbon atoms in the iodo compound represented by the formula $RI_2$ is preferably from 3 to 8. As the iodo compound represented by the formula $RI_2$, an iodo compound having a perfluoroalkylene group is more preferred, and 1,4-diiodoperfluorobutane is most preferred.

Such an iodo compound will function as a chain transfer agent, and therefore, when the above-mentioned monomers are copolymerized in the presence of such a iodo compound, it is possible to introduce iodine atoms to the main chain terminals of copolymer X. Further, in the present invention, in a case where copolymer X having a branched chain can be obtained, it is possible to introduce an iodine atom also to the branched chain terminal. Accordingly, the polymer chain terminal having an iodine atom may be a main chain terminal or a branched chain terminal.

The amount of the iodo compound present at the time of conducting the copolymerization reaction is suitably adjusted by the amount of copolymer X to be produced. For example, it is preferably from 0.005 to 10 parts by mass, more preferably from 0.02 to 5 parts by mass, to 100 parts by mass of copolymer X.

The polymerization method in the production method of the present invention may, for example, be emulsion polymerization, solution polymerization, suspension polymerization, bulk polymerization, etc. From such a viewpoint that adjustment of the molecular weight and copolymer composition of copolymer X is easy, and the productivity is excellent, an emulsion polymerization method of copolymerizing monomers in an aqueous medium in the presence of an emulsifier is preferred.

The aqueous medium is preferably water or water containing a water-soluble organic solvent.

The water-soluble organic solvent may, for example, be tert-butanol, propylene glycol, dipropylene glycol, dipropylene glycol monomethyl ether, tripropylene glycol, etc., and preferred is tert-butanol, propylene glycol or dipropylene glycol monomethyl ether.

When the aqueous medium contains a water-soluble organic solvent, the amount of the water-soluble organic solvent to be used, is preferably from 1 to 50 parts by mass, more preferably from 3 to 20 parts by mass, to 100 parts by mass of water.

In the emulsion polymerization method, the pH of the aqueous medium is preferably from 7 to 14, more preferably from 7 to 11, more preferably from 7.5 to 11, most preferably from 8 to 10.5. When the pH is at least 7, the stability of the iodo compound will be sufficiently maintained, and the crosslinking reaction of obtainable copolymer X will be sufficiently maintained.

The period of time for maintaining the pH of the aqueous medium to be within the above range may not be the entire polymerization period until completion of polymerization from the initiation of the emulsion polymerization, and the period of time for maintaining the pH to be within the above range is preferably at least 80%, more preferably at least 90%, further preferably at least 95% of the entire polymerization period, most preferably the entire polymerization period.

In order to adjust the pH, it is preferred to use a pH buffering agent. The pH buffering agent may, for example, be an inorganic salt, etc. The inorganic salt may, for example, be a phosphate such as disodium hydrogen phosphate or sodium dihydrogen phosphate, or a carbonate such as sodium hydrogen carbonate or sodium carbonate. More preferred specific examples of the phosphate, are disodium hydrogen phosphate dihydrate, disodium hydrogen phosphate 12-hydrate, etc.

As the emulsifier, from such a viewpoint that the mechanical and chemical stability of the obtainable latex of copolymer X will be excellent, an ionic emulsifier is preferred, and an anionic emulsifier is more preferred. As the anionic emulsifier, preferred is a hydrocarbon emulsifier such as sodium lauryl sulfate, sodium dodecylbenzenesulfonate, etc., a fluorinated alkyl carboxylic acid or its salt, such as ammonium perfluorooctanoate, ammonium perfluorohexanoate, ammonium ω-hydroperfluorooctanoate, etc., an emulsifier represented by the following formula (III) (hereinafter referred to as emulsifier (III)), $CF_3O(CF_2O)_nCF_2COONH_4$ (where n=2 or 3), or the like.

$$F(CF_2)_pO(CF(X)CF_2O)_qCF(X)COOA \qquad (III)$$

In the above formula (III), X is a fluorine atom or a $C_{1-3}$ perfluoroalkyl group, A is a hydrogen atom, an alkali metal or $NH_4$, p is an integer of from 1 to 10, and q is an integer of from 0 to 3.

In the above formula (III), p is preferably from 1 to 4, more preferably from 1 to 3. q is preferably from 0 to 2, more preferably 1 or 2. A is preferably a hydrogen atom, Na or $NH_4$, more preferably $NH_4$.

When A in the above formula (III) is $NH_4$, specific examples of the emulsifier (III) may be as follows.

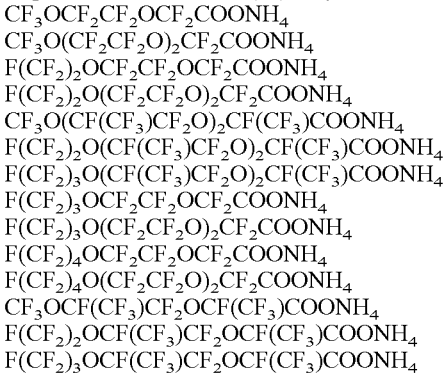

$CF_3OCF_2CF_2OCF_2COONH_4$
$CF_3O(CF_2CF_2O)_2CF_2COONH_4$
$F(CF_2)_2OCF_2CF_2OCF_2COONH_4$
$F(CF_2)_2O(CF_2CF_2O)_2CF_2COONH_4$
$CF_3O(CF(CF_3)CF_2O)_2CF(CF_3)COONH_4$
$F(CF_2)_2O(CF(CF_3)CF_2O)_2CF(CF_3)COONH_4$
$F(CF_2)_3O(CF(CF_3)CF_2O)_2CF(CF_3)COONH_4$
$F(CF_2)_3OCF_2CF_2OCF_2COONH_4$
$F(CF_2)_3O(CF_2CF_2O)_2CF_2COONH_4$
$F(CF_2)_4OCF_2CF_2OCF_2COONH_4$
$F(CF_2)_4O(CF_2CF_2O)_2CF_2COONH_4$
$CF_3OCF(CF_3)CF_2OCF(CF_3)COONH_4$
$F(CF_2)_2OCF(CF_3)CF_2OCF(CF_3)COONH_4$
$F(CF_2)_3OCF(CF_3)CF_2OCF(CF_3)COONH_4$

The amount of the emulsifier to be used, is preferably from 0.01 to 10 parts by mass, more preferably from 0.1 to 5 parts by mass, most preferably from 0.1 to 2 parts by mass, to 100 parts by mass of the aqueous medium.

As a preferred radical polymerization initiator in the production method of the present invention, a water-soluble polymerization initiator, or a redox polymerization initiator is preferred.

The water-soluble polymerization initiator may, for example, be a persulfate such as ammonium persulfate, sodium persulfate, potassium persulfate, etc., an organic polymerization initiator such as disuccinic acid peroxide, azobisisobutylamidine dihydrochloride, etc. Among them, a persulfate is preferred, and ammonium persulfate is more preferred.

The amount of a water-soluble polymerization initiator to be used, is preferably from 0.0001 to 3 mass %, more preferably from 0.001 to 1 mass %, to the total mass of the monomers.

The redox polymerization initiator may be a polymerization initiator having a persulfate and a reducing agent combined. Particularly preferred is a polymerization initiator capable of polymerizing monomers at a polymerization temperature within a range of from 0° C. to 60° C. Specific examples of the persulfate to constitute a redox polymerization initiator, may be alkali metal salts of persulfates, such as ammonium persulfate, sodium persulfate, potassium persulfate, etc. Among them, ammonium persulfate is preferred. The reducing agent to be combined with the persulfate, includes thiosulfates, sulfites, bisulfites, pyrosulfites, hydroxy sulfinic acid salts, etc., and a hydroxy methane sulfinic acid salt is preferred, and a sodium salt of hydroxy methane sulfinic acid is most preferred.

In the redox polymerization initiator, it is preferred to let a small amount of iron, an iron salt, silver sulfate, etc. coexist as a third component, and it is more preferred to let a water-soluble iron salt coexist.

Specific examples of the water-soluble iron salt include ferrous sulfate, ferric sulfate, ferrous nitrate, ferric nitrate, ferrous chloride, ferric chloride, ferrous ammonium sulfate, ferric sulfate ammonium, etc.

At the time of using a redox polymerization initiator, it is preferred to add a chelating agent. As the chelating agent, preferred is a disodium salt of ethylenediaminetetraacetic acid.

In the redox polymerization initiator, the amount of the persulfate to be used, is preferably from 0.001 to 3 mass %, more preferably from 0.01 to 1 mass %, further preferably from 0.05 to 0.5 mass %, in the aqueous medium. The amount of the reducing agent to be used, is preferably from 0.001 to 3 mass %, more preferably from 0.01 to 1 mass %, particularly preferably from 0.05 to 0.5 mass %, in the aqueous medium.

The amount of the third component, such as iron, an iron salt such as ferrous salt, silver sulfate, etc., to be used, is preferably from 0.0001 to 0.3 mass %, more preferably from 0.001 to 0.1 mass %, particularly preferably from 0.01 to 0.1 mass %, in the aqueous medium.

The amount of the chelating agent to be used, is preferably from 0.0001 to 0.3 mass %, more preferably from 0.001 to 0.1 mass %, particularly preferably from 0.01 to 0.1 mass %, in the aqueous medium.

The polymerization conditions such as the polymerization pressure, polymerization temperature, etc. in the production method of the present invention, are suitably selected depending upon the composition of monomers, the decomposition temperature of the radical polymerization initiator, etc.

The polymerization pressure is preferably from 1.0 to 10 MPaG, more preferably from 1.5 to 5.0 MPaG, most preferably from 2.0 to 4.0 MPaG.

When the polymerization pressure is at least 1.0 MPaG, the polymerization rate will be sufficiently maintained, the reaction can easily be controlled, and the productivity will be excellent. When the polymerization pressure is at most 10 MPaG, the production can be made by a commonly employed inexpensive polymerization equipment.

The polymerization temperature is preferably from 0 to 60° C., more preferably from 10 to 50° C., particularly preferably from 20 to 40° C.

When the polymerization temperature is within the above range, copolymer X excellent in crosslinking reactivity can be easily obtained, and the obtainable crosslinked rubber will be excellent in mechanical properties.

In the production method of the present invention, the polymerization rate is preferably from 10 to 100 g/L·hour, more preferably from 5 to 70 g/L·hour, further preferably from 30 to 50 g/L·hour. When the polymerization rate is at least the above lower limit value, such may be regarded as practical productivity. When the polymerization rate is at most the above upper limit value, the molecular weight of obtainable copolymer X becomes sufficiently high, and the crosslinking reactivity will also be excellent.

In the present invention, as a method to isolate copolymer X from the latex obtained by the emulsion polymerization method, a method for flocculating it by a known method may be exemplified.

Such a flocculation method may, for example, be a method for salting out by adding a metal salt to the latex, a method of adding an inorganic acid such as hydrochloric acid to the latex, a method for mechanically shearing the latex, a method of freezing the latex, followed by thawing, etc. It is also preferred that the latex is optionally diluted with water or the like, followed by flocculation.

Isolated copolymer X is preferably dried by using a drying apparatus such as an oven. The drying temperature is preferably from 60 to 150° C., more preferably from 80 to 120° C. Within this range, the crosslinking reactivity of dried copolymer X will be further excellent, and the mechanical properties of the crosslinked rubber after the crosslinking will be further excellent.

<Crosslinked Rubber>

The crosslinked rubber of the present invention is a crosslinked rubber having the above-described copolymer X crosslinked.

The compression set of the crosslinked rubber of the present invention, as measured in accordance with JIS K6262, under conditions of 200° C. and 22 hours, is preferably at most 50%, more preferably at most 40%, further preferably at most 25%, particularly preferably at most 20%, most preferably at most 15%. Also under conditions of 250° C. and 22 hours, it is preferably the same as described above. The lower limit value is not particularly limited and may be 0%.

The crosslinked rubber of the present invention is formed into a thickness of 2 mm sheet, which is punched by No. 3 dumbbell to prepare a punched sample, whereupon the tensile strength is measured in accordance with JIS K6251 at 25° C., and such a tensile strength is preferably at least 15 MPa, more preferably at least 18 MPa, further preferably at least 21 MPa. The upper limit value is not particularly limited, but may, for example, be about 100 MPa.

The crosslinked rubber of the present invention is preferably produced by a method for producing a crosslinked rubber of the present invention as described below, but is not limited to one produced by the following production method.

<Method for Producing Crosslinked Rubber>

The method for producing a crosslinked rubber of the present invention is preferably a production method wherein the above-described copolymer X is crosslinked with an organic peroxide. As a specific example, a method may be mentioned wherein a crosslinkable composition comprising copolymer X and an organic peroxide is prepared, and such a crosslinkable composition is heated to produce a crosslinked rubber having copolymer X crosslinked.

As the crosslinkable composition, preferred is one which comprises copolymer X and an organic peroxide and further contains at least one additive selected from a crosslinking aid, a processing aid, a filler and a reinforcing agent.

The organic peroxide may, for example, be a dialkyl peroxide, a 1,1-di(tert-butylperoxy)-3,3,5-trimethylcyclohexane, 2,5-dimethyl-2,5-dihydroxy peroxide, benzoyl peroxide, tert-butylperoxybenzene, 2,5-dimethyl-2,5-di(benzoyl peroxy)hexane, tert-butylperoxy maleic acid, tert-butylperoxy isopropyl carbonate, etc. Among them, a dialkyl peroxide is preferred.

The dialkyl peroxide includes, for example, di-tert-butyl peroxide, tert-butyl cumyl peroxide, dicumyl peroxide, α,α-bis(tert-butylperoxy)-p-diisopropylbenzene, α,α-bis(tert-butylperoxy)-m-diisopropylbenzene, 2,5-dimethyl-2,5-di(tert-butylperoxy)hexane, 2,5-dimethyl-2,5-di(tert-butylperoxy)-3-hexyne, etc.

The content of the organic peroxide in the crosslinkable composition is preferably from 0.3 to 10 parts by mass, more preferably from 0.3 to 5 parts by mass, further preferably from 0.5 to 3 parts by mass, to 100 parts by mass of copolymer X. When the content of the organic peroxide is within the above range, the crosslinking rate will be proper, and the obtainable crosslinked rubber will be excellent in tensile strength and will have a smaller compression set at high temperatures.

It is preferred to blend a crosslinking aid at the time of crosslinking copolymer X, since it is thereby possible to further improve the crosslinking reactivity. The crosslinking aid includes, for example, triallyl cyanurate, triallyl isocyanurate, trimethallyl isocyanurate, 1,3,5-triacryloylhexahydro-1,3,5-triazine, triallyl trimellitate, m-phenylenediamine bismaleimide, p-quinone dioxime, p,p'-dibenzoyl quinone dioxime, dipropargyl terephthalate, diallyl phthalate, N,N',N'',N'''-tetraallylterephthalamide, a vinyl group-containing siloxane oligomer (polymethyl vinyl siloxane, polymethyl phenyl vinyl siloxane, etc.), etc. Among them, triallyl cyanurate, triallyl isocyanurate or trimethallyl isocyanurate is preferred, and triallyl isocyanurate is more preferred.

In a case where the crosslinkable composition contains a crosslinking aid, the content of the crosslinking aid in the composition is preferably from 0.1 to 20 parts by mass, more preferably from 1 to 10 parts by mass, to 100 parts by mass of copolymer X. When the content of the crosslinking aid is within the above range, the crosslinking rate will be proper, and the obtainable crosslinked rubber will be excellent in tensile strength and will have a smaller compression set at high temperatures.

The crosslinkable composition may contain a processing aid, as the case requires. The processing aid may, for example, be a fatty acid metal salt or a fatty acid ester. As the fatty acid metal salt, preferred is a metal salt represented by the following formula (IV).

$$(RCOO^-)_n M^{n+} \quad (IV)$$

(wherein R is a $C_{10-30}$ organic group, n is an integer of 2 or 3, and M is an alkaline earth metal, Zn, Cd, Co, Sn, Cu, Pb, Ni or Al).

Said R is a $C_{10-30}$ organic group. The number of carbon atoms in the organic group is preferably from 10 to 25, more preferably from 10 to 20, most preferably from 12 to 18. The organic group may be saturated or unsaturated, and an aliphatic hydrocarbon group is preferred; a linear aliphatic hydrocarbon group is more preferred, and a saturated linear aliphatic hydrocarbon group is most preferred.

The metal salt represented by the formula (IV) is a higher fatty acid metal salt, commonly known as a processing aid. The fatty acid may be a naturally derived component such as an animal fatty acid, or an artificially synthesized component. Further, it may be a mixture of two or more types of fatty acids different in the number of carbon atoms.

M is preferably an alkaline earth metal, Zn, Pb or Al, more preferably Mg, Ba, Ca, Zn or Al, further preferably Ca or Al, most preferably Ca.

Specific examples of the metal salt represented by the formula (IV) include calcium stearate, zinc stearate, barium stearate, magnesium stearate, aluminum stearate, cadmium stearate, cobalt stearate, tin stearate, lead stearate, copper stearate, nickel stearate, lithium stearate, calcium ricinoleate, zinc palmitate, aluminum myristate, etc. Two or more of them may be contained in the composition.

As the metal salt represented by the formula (IV), among them, preferred is calcium stearate, zinc stearate, barium stearate, magnesium stearate or aluminum stearate, and more preferred is calcium stearate or aluminum stearate. Further, most preferred is calcium stearate.

In a case where the crosslinkable composition contains a processing aid, the content of the metal salt in the composition is preferably from 0.1 to 10 parts by mass, to 100 parts by mass of copolymer X. Such a content is suitably determined within the above range, depending upon the composition of the composition containing fillers or additives suitable for obtaining the desired cross-linked rubber member. The content is further preferably from 0.2 to 5 parts by mass, still more preferably from 0.2 to 3 parts by mass, most preferably from 0.3 to 2 parts by mass. If the content is too small, the molding processability becomes to be inferior, and if it is too large, the heat resistance of the obtainable crosslinked rubber member may be lowered. When it is within the above range, the molding processability will be excellent, and the crosslinked rubber member will be significantly excellent in hot water resistance and steam resistance.

The crosslinkable composition may also contain a filler or reinforcing agent as the case requires. The filler or reinforcing agent may, for example, be carbon black, hydrophobic silica, barium sulfate, calcium metasilicate, calcium carbonate, titanium oxide, silicon dioxide, clay, talc, etc. In particular, carbon black is preferred.

In a case where the composition contains a filler or reinforcing agent, the content thereof in the composition is preferably from 1 to 100 parts by mass, more preferably from 3 to 50 parts by mass, most preferably from 5 to 45 parts by mass, to 100 parts by mass of copolymer X. When the content is within the above range, the rubber will be reinforced and will be excellent in mechanical properties such as elastic modulus and strength.

The crosslinkable composition may contain a metal oxide as the case requires. As the metal oxide, an oxide of a divalent metal is preferred. As the oxide of a divalent metal, preferred may, for example, be magnesium oxide, calcium oxide, zinc oxide, lead oxide, etc. When the composition contains a metal oxide, the content of the metal oxide in the composition is preferably from 0.1 to 10 parts by mass, more preferably from 0.5 to 5 parts by mass, to 100 parts by mass of copolymer X.

The crosslinkable composition may contain additives such as vulcanizing agents, coloring pigments, and fillers or reinforcing agents other than those mentioned above, which are commonly known as additives for rubber, as the case requires. As the vulcanizing agents, a thiourea-based vulcanizing agent, etc. may be mentioned. As the fillers or reinforcing agents other than those mentioned above, polytetrafluoroethylene, polyvinylidene fluoride, polyvinyl fluoride, polychlorotrifluoroethylene, a tetrafluoroethylene/ethylene copolymer, a tetrafluoroethylene/vinylidene fluoride copolymer, etc. may be mentioned.

As the device for mixing materials in the preparation of a crosslinkable composition, a rubber mixing device such as a roll mill, a kneader, a Banbury mixer or an extruder may, for example, be mentioned.

As the method for molding the crosslinkable composition, compression molding, injection molding, extrusion molding, or a method for molding by dipping or coating as dissolved in a solvent, may be exemplified.

As the method for producing a crosslinked rubber by using the crosslinkable composition, various methods such as heat-press crosslinking, steam crosslinking, hot air crosslinking, etc. may be mentioned. From these methods, a suitable method may be suitably selected for use in consideration of the shape and usage of the molded product. The crosslinking temperature is preferably from 100 to 400° C. in a range of from a few seconds to 24 hours.

By a method for heat pressing a crosslinkable composition, the crosslinkable composition may be crosslinked at the same time as being molded. Otherwise, after obtaining a molded product by preliminarily molding a crosslinkable composition, such a molded product may be crosslinked.

A crosslinked rubber obtained by primary crosslinking by heating a crosslinkable composition, is preferably further heated to conduct secondary crosslinking. By conducting such secondary crosslinking, it is possible to stabilize or improve the mechanical properties, compression set and other characteristics of the crosslinked rubber. The heating conditions at the time of conducting the secondary crosslinking are preferably from 100 to 300° C. and from about 30 minutes to 48 hours.

As a method for producing a crosslinked rubber by using the crosslinkable composition, instead of the method of heating, a method of applying radiation to the crosslinkable composition is also preferred. The radiation to be applied may, for example, be electron beams, ultraviolet rays, etc. The irradiation amount in the electron beam irradiation is preferably from 0.1 to 30 Mrad, more preferably from 1 to 20 Mrad. In the case of crosslinking by irradiation, the crosslinkable composition may be a composition which does not contain an organic peroxide and which contains an additive such as a crosslinking aid or a processing aid. By conducting radiation before crosslinking or after primary or secondary crosslinking of the crosslinkable composition, the plasma resistance will be improved.

Advantageous Effects

According to the present invention, it is possible to obtain a crosslinked rubber which is excellent in tensile strength and which has a small compression set at high temperatures. The reason for this, is considered to be such that copolymer X is excellent in crosslinking reactivity, and the crosslinked structure of copolymer X is maintained even at high temperatures.

The reason for the excellent crosslinking reactivity of copolymer X is considered to be such that iodine atoms at branched chain terminals obtained by the monomer (b) serve to enhance the crosslinking reactivity.

The reason as to why the crosslinked structure of copolymer X is maintained even at high temperatures, is considered to be such that the $R^4$ portion of the monomer (b) contributes to the improvement of thermal stability and oxidation resistance.

EXAMPLES

The present invention will be described specifically with reference to the following Examples, but the present invention should not be construed as being limited thereto. The respective properties were measured by the following methods.

[Measurement of Copolymer Composition]

By calculating the content of structural units based on TFE in the copolymer by the fluorine content analysis, and the content of structural units based on the vinyl ether by infrared absorption spectrum, the copolymer composition was determined.

[Measurement of Iodine Content]

The iodine content in the copolymer was quantified by an apparatus having an ion chromatograph and a pretreatment device AQF-100 type for ion chromatograph for automatic sample combustion device combined, manufactured by Dia Instruments Corporation.

[Measurement of Crosslinking Properties]

A blend was formulated in accordance with the components and the blend species and amounts as shown in Tables 2 to 6, and kneaded at room temperature for 10 minutes to obtain a uniformly mixed crosslinkable composition.

With respect to the obtained crosslinkable composition, the crosslinking properties were measured by using a crosslinking property measuring machine (trade name "RPA2000" manufactured by Alpha Technologies Inc.) under conditions at 177° C. for 12 minutes at an amplitude of 3 degrees.

The measured $M_H$ represents the maximum value of torque, $M_L$ represents the minimum value of torque, and $M_H$-$M_L$ represents the crosslinking degree. The crosslinking degree becomes an index for the crosslinking reactivity of the fluorinated elastic copolymer, i.e. the larger the value of $M_H$-$M_L$, the better the crosslinking reactivity.

[Measurement of Tensile Strength]

After hot pressing (primary crosslinking) the above crosslinkable composition at 170° C. for 20 minutes, secondary crosslinking was conducted for 4 hours in an oven at 200° C., to obtain a crosslinked rubber sheet having a thickness of 2 mm. The obtained crosslinked rubber sheet was punched by No. 3 dumbbell to prepare a sample for measurement, whereupon the tensile strength was measured at 25° C. in accordance with JIS K6251.

[Measurement of Compression Set]

After hot pressing (primary crosslinking) the above crosslinkable composition at 170° C. for 10 minutes, secondary crosslinking was conducted for 4 hours in an oven at 200° C., to obtain a molded product made of a cylindrical crosslinked rubber having a diameter of 30 mm and a height of 13 mm. Using this molded product as a sample for measurement, compression set tests were conducted in accordance with JIS K6262, under conditions of 200° C. for 22 hours, and 250° C. for 22 hours, respectively, to measure the compression set.

[Measurement of Storage Modulus G']

Using RPA2000 manufactured by Alpha Technologies Inc., in accordance with ASTM D5289 and D6204, the storage modulus was measured at a temperature of 100° C. at an amplitude of 0.5 degrees at a frequency of 50 times/min.

[Measurement of Hot Cracking]

By hot pressing the above crosslinkable composition at 170° C. for 12 minutes, to obtain a crosslinked rubber sheet having a thickness of 2 mm. In a state where this sheet was kept at 60° C., the presence or absence of cracking was observed when bent at 180°.

Abbreviations of the compounds used in the preparation of copolymers are shown below.

C4DVE: $CF_2=CFO(CF_2)_4OCF=CF_2$
C3DVE: $CF_2=CFO(CF_2)_3OCF=CF_2$
C6DV: $CH_2=CH(CF_2)_6CH=CH_2$
VC: vinyl crotonate
DEGDVE: diethylene glycol divinyl ether Example 1

(Production of Copolymer A (TFE/C4DVE/Propylene Copolymer))

After degassing the inside of a stainless steel pressure-resistant reactor having an inner volume of 3,200 mL equipped with a stirring anchor blade, into the reactor, 1,500 g of deionized water, 59 g of disodium hydrogen phosphate dodecahydrate, 0.7 g of sodium hydroxide, 197 g of tert-butanol, 9 g of sodium lauryl sulfate, 9 g of 1,4-diiodoperfluorobutane, 5.6 g of C4DVE and 6 g of ammonium persulfate were added. Further, an aqueous solution prepared by dissolving 0.4 g of ethylenediamine tetraacetic acid disodium salt dihydrate (hereinafter referred to as EDTA) and 0.3 g of ferrous sulfate heptahydrate in 100 g of ion exchanged water, was added to the reactor. The pH of the aqueous medium in the reactor at this time was 9.5.

Then, at 25° C., a monomer mixture gas of TFE/propylene=88/12 (molar ratio) was injected so that the internal pressure of the reactor would be 2.50 MPaG. The anchor blade was rotated at 300 rpm, and then, a 2.5 mass % aqueous solution (hereinafter referred to as a Rongalite 2.5 mass % aqueous solution) of sodium hydroxymethanesulfinate dihydrate (hereinafter referred to as Rongalite) having the pH adjusted to 10.0 by sodium hydroxide, was added to the reactor to initiate a polymerization reaction. Thereafter, the Rongalite 2.5 mass % aqueous solution, was continuously added to the reactor by means of a high pressure pump.

At the time when the total injected amount of the monomer mixture gas of TFE/propylene became 1,000 g, the addition of the Rongalite 2.5 mass % aqueous solution was stopped, and the internal temperature of the reactor was cooled to 10° C. to terminate the polymerization reaction, to obtain a latex of copolymer A. The amount of the Rongalite 2.5 mass % aqueous solution added, was 68 g. The polymerization time was 6 hours.

A 5 mass % aqueous solution of calcium chloride was added to the above latex to flocculate the latex of copolymer A, to precipitate copolymer A. Copolymer A was filtered and recovered. Then, copolymer A was washed with deionized water and dried for 15 hours in an oven at 100° C. to obtain 980 g of white copolymer A.

In the infrared absorption spectrum of copolymer A, an absorption based on carbon-carbon double bond was confirmed in the vicinity of 1700 $cm^{-1}$.

The copolymerization composition of copolymer A, was TFE units/C4DVE units/P units=56/0.1/43.9 (molar ratio). The iodine content in copolymer A was 0.50 mass %.

The crosslinking properties and crosslinked rubber physical properties of the copolymer A are shown in Table 1.

Examples 2 to 6, Comparative Examples 1 to 3

Copolymers B to H were obtained by conducting syntheses in the same manner as in Example 1 except that C4DVE was changed in Example 2 to 11.2 g, in Example 3 to 16.8 g, in Example 4 to 22.4 g, in Example 5 to 9.8 g of C3DVE, in Example 6 to 10.0 g of C6DV, in Comparative Example 1 to 3.2 g of vinyl crotonate, and in Comparative Example 2 to 4.5 g of DEGDVE, respectively. In Comparative Example 3, copolymer I was obtained by conducting the synthesis in the same manner as in Example 1 except that the monomer (b) and 1,4-diiodoperfluorobutane were not used.

The compositions and iodine contents in copolymers A to I are shown in Table 1.

TABLE 1

|  | Examples | | | | | | Comparative Examples | | |
| --- | --- | --- | --- | --- | --- | --- | --- | --- | --- |
|  | 1 | 2 | 3 | 4 | 5 | 6 | 1 | 2 | 3 |
| Copolymer | A | B | C | D | E | F | G | H | I |
| TFE units (mol %) | 56 | 56 | 56 | 56 | 56 | 56 | 56 | 56 | 56 |
| C4DVE units (mol %) | 0.1 | 0.2 | 0.3 | 0.4 | — | — | — | — | — |
| C3DVE units (mol %) | — | — | — | — | 0.2 | — | — | — | — |
| C6DV units (mol %) | — | — | — | — | — | 0.2 | — | — | — |
| VC units (mol %) | — | — | — | — | — | — | 0.2 | — | — |
| DEGDVE units (mol %) | — | — | — | — | — | — | — | 0.2 | — |
| P units (mol %) | 43.9 | 43.8 | 43.7 | 43.6 | 43.8 | 43.8 | 43.8 | 43.8 | 44 |
| Iodine content (mass %) | 0.5 | 0.5 | 0.5 | 0.5 | 0.5 | 0.5 | 0.5 | 0.5 | — |

Examples 7 to 35, Comparative Examples 4 to 6

To the copolymers produced in Examples 1 to 6 and Comparative Examples 1 to 3, the following peroxide and various additives were blended to obtain crosslinkable compositions, and by using the compositions, the above-mentioned physical properties such as crosslinking properties ($M_H$-$M_L$), tensile strength, etc. were measured. The compositions of such compositions and the physical properties of crosslinked rubbers obtained from such compositions are shown in Tables 2 to 6. Abbreviations of peroxides and various additives listed in Tables 2 to 6 are as follows.

Perkadox 14: α,α'-bis(tert-butylperoxy)-p-diisopropylbenzene (manufactured by Kayaku Akzo Corporation).
Perhexa 25B: 2,5-dimethyl-2,5-bis(tert-butylperoxy)hexane (manufactured by NOF Corporation).
DCP: dicumyl peroxide.
TAIC: triallyl isocyanurate (manufactured by Nippon Kasei Chemical Co., Ltd.),
St-Ca: calcium stearate (manufactured by Kanto Chemical Co., Inc.).
Emaster 510P: processing aid (manufactured by Riken Vitamin Co., Ltd.)
DBU: 1,8-diazabicyclo[5.4.0]undecene-7.

MT-carbon: carbon black (manufactured by CANCARB Co., Ltd.).

Austin Black: carbon black (manufactured by Shiraishi Calcium Kaisha, Ltd., "Austin Black 325").

SRF-L Asahi #35: carbon black (manufactured by Asahi Carbon Co., Ltd.).

SAF-H Asahi #50: carbon black (manufactured by Asahi Carbon Co., Ltd.).

FEF Asahi #60G: carbon black (manufactured by Asahi Carbon Co., Ltd.).

HAF-C Asahi #70: carbon black (manufactured by Asahi Carbon Co., Ltd.).

Asahi Thermal (FT): carbon black (manufactured by Asahi Carbon Co., Ltd.).

ISAF Seast 6: carbon black (manufactured by Tokai Carbon Co. Ltd.).

HAF Seast 3: carbon black (manufactured by Tokai Carbon Co., Ltd.).

SAF-H Seast SP: carbon black (manufactured by Tokai Carbon Co., Ltd.).

GPF Seast V: carbon black (manufactured by Tokai Carbon Co. Ltd.).

MAF Seast 16: carbon black (manufactured by Tokai Carbon Co., Ltd.).

R8200: hydrophobic silica (manufactured by Nippon Aerosil Co., Ltd.).

BaSO$_4$: manufactured by Sakai Chemical Industry Co., Ltd. "precipitated barium sulfate 100".

Wollastonite: (manufactured by Nagase & Co., Ltd. "NYAD325").

TiO$_2$: manufactured by Sakai Chemical Industry Co., Ltd. "titanium oxide A-190".

Hakuenka AA: (manufactured by Shiraishi Calcium Kaisha, Ltd.)

TABLE 2

|  |  | Examples |  |  |  |  |  |
|---|---|---|---|---|---|---|---|
|  |  | 7 | 8 | 9 | 10 | 11 | 12 |
| Copolymer G' |  | A 229 | B 306 | C 330 | D 400 | E 310 | F 386 |
| Blend species (parts by mass) | Copolymer | 100 | ← | ← | ← | ← | ← |
|  | MT carbon | 30 | ← | ← | ← | ← | ← |
|  | TAIC | 5 | ← | ← | ← | ← | ← |
|  | St-Ca |  |  |  |  |  |  |
|  | Perkadox 14 | 1 | ← | ← | ← | ← | ← |
| Physical properties | $M_H$-$M_L$ | 69 | 87 | 102 | 118 | 88 | 71 |
|  | Tensile strength | 25 | 23 | 24 | 24 | 24 | 24 |
|  | High temperature cracking | Nil | Nil | Nil | Nil | Nil | Nil |
|  | Compression set | 220° C. 22 h | 15 | 9 | 8 | 7 | 9 | 30 |
|  |  | 250° C. 22 h | 16 | 10 | 8 | 9 | 10 | 33 |

TABLE 3

|  |  | Examples |  |  |  |  |
|---|---|---|---|---|---|---|
|  |  | 13 | 14 | 15 | 16 | 17 | 18 |
| Copolymer G' |  |  |  | E 310 |  |  |  |
| Blend species (parts by mass) | Copolymer | 100 | ← | ← | ← | 100 | ← |
|  | MT carbon | 30 | ← | ← | ← | 8 | ← |
|  | TAIC | 3 | ← | ← | ← | 3 | ← |
|  | St-Ca | 1 | ← | ← | ← | 1 | ← |
|  | Perkadox 14 | 1 |  |  | 1.5 | 1 |  |
|  | Perhexa 25B |  | 1 |  |  |  | 1.5 |
|  | DCP |  |  | 1.5 |  |  |  |
|  | Austin Black |  |  |  |  | 17 | ← |
| Physical properties | $M_H$-$M_L$ | 88 | 74 | 75 | 73 | 80 | 82 |
|  | Tensile strength | 24 | 20 | 20 | 16.4 | 15.1 | 16.3 |
|  | High temperature cracking | Nil | Nil | Nil | Nil | Nil | Nil |
|  | Compression set | 220° C. 22 h | 9 | 9 | 10 | 9 | 8 | 9 |
|  |  | 250° C. 22 h | 10 | 10 | 10 | 9 | 7 | 8 |

TABLE 4

|  |  | Examples |  |  |  |  |  |  |  |  |  |
|---|---|---|---|---|---|---|---|---|---|---|---|
|  |  | 19 | 20 | 21 | 22 | 23 | 24 | 25 | 26 | 27 | 28 |
| Copolymer G' |  |  |  |  |  | E 310 |  |  |  |  |  |
| Blend species (parts by mass) | Copolymer | 100 | ← | ← | ← | ← | ← | ← | ← | ← | ← |
|  | TAIC | 3 | ← | ← | ← | ← | ← | ← | ← | ← | ← |
|  | St-Ca | 1 | ← | ← | ← | ← | ← | ← | ← | ← | ← |
|  | Perkadox 14 | 1 | ← | ← | ← | ← | ← | ← | ← | ← | ← |
|  | SRF-L #35 | 30 |  |  |  |  |  |  |  |  |  |
|  | SAF-H Asahi #50 |  | 30 |  |  |  |  |  |  |  |  |
|  | ISAF Seast 6 |  |  | 30 |  |  |  |  |  |  |  |
|  | FEF Asahi #60G |  |  |  | 30 |  |  |  |  |  |  |
|  | HAF Seast 3 |  |  |  |  | 30 |  |  |  |  |  |
|  | SAF-H Seast SP |  |  |  |  |  | 30 |  |  |  |  |
|  | GPF Seast V |  |  |  |  |  |  | 30 |  |  |  |
|  | MAF Seast 16 |  |  |  |  |  |  |  | 30 |  |  |
|  | HAF-C Asahi #70 |  |  |  |  |  |  |  |  | 30 |  |
|  | Asahi Thermal (FT) |  |  |  |  |  |  |  |  |  | 30 |
| Physical properties | $M_H$-$M_L$ | 78 | 84 | 78 | 98 | 72 | 76 | 83 | 91 | 72 | 68 |
|  | Tensile strength | 18.4 | 19.1 | 21.8 | 20.0 | 21.9 | 10.8 | 22.7 | 21.5 | 21.6 | 18.3 |
|  | High temperature cracking | Nil | Nil | Nil | Nil | Nil | Nil | Nil | Nil | Nil | Nil |

TABLE 4-continued

|  |  | Examples | | | | | | | | | |
|---|---|---|---|---|---|---|---|---|---|---|
|  |  | 19 | 20 | 21 | 22 | 23 | 24 | 25 | 26 | 27 | 28 |
| Compression set | 220° C. 22 h | 11 | 10 | 16 | 10 | 13 | 11 | 8 | 10 | 12 | 10 |
|  | 250° C. 22 h | 11 | 10 | 16 | 10 | 13 | 11 | 9 | 10 | 12 | 10 |

TABLE 5

|  |  | Examples | | | | | | |
|---|---|---|---|---|---|---|---|---|
|  |  | 29 | 30 | 31 | 32 | 33 | 34 | 35 |
|  | Copolymer G' |  |  |  | E 310 |  |  |  |
| Blend species (parts by mass) | Copolymer | 100 | ← | ← | ← | ← | ← | ← |
|  | MT carbon | 30 | ← |  |  |  |  |  |
|  | TAIC | 3 | ← | ← | ← | ← | ← | ← |
|  | St-Ca | 1 |  | ← | ← | ← | ← | ← |
|  | Perkadox 14 | 1 | ← | ← | ← | ← | ← | ← |
|  | Emaster 510P | 2 |  |  |  |  |  |  |
|  | DBU |  | 0.5 |  |  |  |  |  |
|  | R8200 |  |  |  | 15 |  |  |  |
|  | BaSO$_4$ |  |  | 50 |  |  |  |  |
|  | Wollastonite |  |  |  |  | 30 |  |  |
|  | TiO$_2$ |  |  | 2 | ← | ← | ← | ← |
|  | Hakuenka AA |  |  |  |  |  | 30 | ← |
| Physical properties | $M_H$-$M_L$ | 60 | 59 | 69 | 66 | 66 | 59 | 70 |
|  | Tensile strength | 16.2 | 16.1 | 15.0 | 21.4 | 11.6 | 13.3 | 16.3 |
|  | High temperature cracking | Nil | Nil | Nil | Nil | Nil | Nil | Nil |
|  | Compression set | 220° C. 22 h | 13 | 19 | 16 | 12 | 15 | 28 | 23 |
|  |  | 250° C. 22 h | 14 | 20 | 17 | 13 | 16 | 27 | 24 |

TABLE 6

|  |  | Comparative Examples | | |
|---|---|---|---|---|
|  |  | 4 | 5 | 6 |
|  | Copolymer G' | G 377 | H 500 | I 300 |
| Blend species (parts by mass) | Copolymer | 100 | ← | ← |
|  | MT carbon | 30 | ← | ← |
|  | TAIC | 5 | ← | ← |
|  | St-Ca |  |  | 1 |
|  | Perkadox 14 | 1 | ← | ← |
| Physical properties | $M_H$-$M_L$ | 53 | 24 | 30 |
|  | Tensile strength | 12 | 10 | 13 |
|  | High temperature cracking | Nil | Nil | Nil |
|  | Compression set | 220° C. 22 h | 40 | 55 | 32 |
|  |  | 250° C. 22 h | 50 | 66 | 35 |

From the above results, each of fluorinated elastic copolymers in Examples 1 to 6 obtained by copolymerizing the particular monomer (a), monomer (b) and monomer (c) in the presence of an iodo compound, had a larger value of ($M_H$-$M_L$) and was excellent in crosslinking reactivity. Further, each of crosslinked rubbers obtained from the crosslinkable compositions in Examples 7 to 35 was not cracked at high temperatures, had a low compression set at high temperatures, and was excellent in tensile strength.

As is clear from Examples 1 to 4 and Examples 7 to 10, the fluorinated elastic copolymer and crosslinked rubber showed more excellent crosslinking reactivity and crosslinked rubber physical properties, as the content of the monomer (b) became higher.

On the other hand, as shown in Comparative Examples 1 to 6, each of fluorinated elastic copolymers not having structural units based on the monomer (b), was poor in crosslinking reactivity and insufficient in crosslinked rubber physical properties.

INDUSTRIAL APPLICABILITY

The fluorinated elastic copolymer of the present invention is excellent in crosslinking reactivity and is capable of presenting a crosslinked rubber which is excellent in mechanical properties, heat resistance, chemical resistance, oil resistance and weather resistance. The obtained crosslinked rubber is suitable as a material for O-rings, sheets, gaskets, oil seals, diaphragms, V-rings, etc. Further, it can be applied also to applications as heat resistant and chemical resistant sealing material, heat resistant and oil resistant sealing material, electric wire covering material, sealing material for a semiconductor device, corrosion-resistant rubber coating material, anti-urea grease sealing material, rubber paint, adhesive rubber, hoses, tubes, calendar sheet (roll), sponge, rubber roll, oil drilling member, heat dissipation sheet, solution crosslinked, rubber sponge, bearing seal (e.g. urea resistant grease), lining (chemical resistant), automotive insulation sheet, insulation sheet for electronic equipment, rubber band for watches, endoscopic packing (amine resistant), bellows hose (processed from a calendar sheet), water heater packing/valve, fenders (marine civil engineering, marine), fibers, nonwoven fabric (protective clothing, etc.), base sealant, rubber gloves, uniaxial eccentric screw pump stator, parts for a urea SCR system, anti-vibration agent, damping agent, sealing agent, additive to other materials, toys, etc.

This application is a continuation of PCT Application No. PCT/JP2016/078720, filed on Sep. 28, 2016, which is based upon and claims the benefit of priority from Japanese Patent Application No. 2015-196146 filed on Oct. 1, 2015. The contents of those applications are incorporated herein by reference in their entireties.

What is claimed is:

1. A fluorinated elastic copolymer characterized by having iodine atoms and also having structural units (A) based on the following monomer (a), structural units (B) based on the following monomer (b) and structural units (C) based on the following monomer (c):
Monomer (a): at least one member selected from the group consisting of tetrafluoroethylene, hexafluoropropylene, vinylidene fluoride, chlorotrifluoroethylene and a perfluoro(alkyl vinyl ether),
Monomer (b): at least one member selected from compounds represented by the following formula (I), $$CR^1R^2{=}CR^3{-}R^4{-}CR^5{=}CR^6R^7 \quad (I)$$

(wherein $R^1$, $R^2$, $R^3$, $R^5$, $R^6$ and $R^7$ are each independently a hydrogen atom, a fluorine atom or a methyl group, and $R^4$ is a $C_{1-10}$ perfluoroalkylene group or such a perfluoroalkylene group having an etheric oxygen atom at one or each of its both terminals or between carbon-carbon bond atoms),
Monomer (c): at least one member selected from the group consisting of ethylene and propylene.

2. The fluorinated elastic copolymer according to claim 1, wherein the content of the structural units (B) to all structural units in the fluorinated elastic copolymer is from 0.1 to 1.5 mol %.

3. The fluorinated elastic copolymer according to claim 1, wherein the molar ratio of the structural units (A) to the structural units (C) ((A)/(C)) is from 30/70 to 99/1.

4. The fluorinated elastic copolymer according to claim 1, wherein $R^1$, $R^2$, $R^3$, $R^5$, $R^6$ and $R^7$ are each independently a fluorine atom or a hydrogen atom.

5. The fluorinated elastic copolymer according to claim 1, wherein the monomer (b) is at least one member selected from the group consisting of $CF_2{=}CFO(CF_2)_3OCF{=}CF_2$, $CF_2{=}CFO(CF_2)_4OCF{=}CF_2$ and $CH_2{=}CH(CF_2)_6CH{=}CH_2$.

6. The fluorinated elastic copolymer according to claim 1, wherein the content of iodine atoms in the fluorinated elastic copolymer is from 0.01 to 5 mass % to the total mass of the fluorinated elastic copolymer.

7. The fluorinated elastic copolymer according to claim 1, wherein the monomer (a) is tetrafluoroethylene, the monomer (c) is propylene, and the molar ratio of the structural units (A) to the structural units (C) ((A)/(C)) is from 40/60 to 60/40.

8. A method for producing a fluorinated elastic copolymer, characterized by copolymerizing the following monomer (a), the following monomer (b) and the following monomer (c) in the presence of a radical polymerization initiator and an iodo compound represented by the formula $RI_2$ (wherein R is an alkylene group or perfluoroalkylene group having at least 3 carbon atoms):
Monomer (a): at least one member selected from the group consisting of tetrafluoroethylene, hexafluoropropylene, vinylidene fluoride, chlorotrifluoroethylene and a perfluoro(alkyl vinyl ether),
Monomer (b): at least one member selected from the group consisting of compounds represented by the following formula (I), $$CR^1R^2{=}CR^3{-}R^4{-}CR^5{=}CR^6R^7 \quad (I)$$

(wherein $R^1$, $R^2$, $R^3$, $R^5$, $R^6$ and $R^7$ are each independently a hydrogen atom, a fluorine atom or a methyl group, and $R^4$ is a $C_{1-10}$ perfluoroalkylene group or such a perfluoroalkylene group having an etheric oxygen atom at one or each of its both terminals or between carbon-carbon bond atoms),
Monomer (c): at least one member selected from the group consisting of ethylene and propylene.

9. The method for producing a fluorinated elastic copolymer according to claim 8, wherein the polymerization temperature is within a range of from 0° C. to 60° C.

10. A crosslinked rubber having the fluorinated elastic copolymer as defined in claim 1 crosslinked.

11. A method for producing a crosslinked rubber, characterized by crosslinking the fluorinated elastic copolymer as defined in claim 1 with an organic peroxide, to obtain a crosslinked rubber.

12. A crosslinkable composition comprising the fluorinated elastic copolymer as defined in claim 1 and an organic peroxide.

13. The crosslinkable composition according to claim 12, which further contains at least one additive selected from a crosslinking aid, a processing aid, a filler and a reinforcing agent.

* * * * *